Nov. 20, 1956  T. D. BAXTER ET AL  2,771,194
METHOD OF FILTERING
Filed Sept. 14, 1953
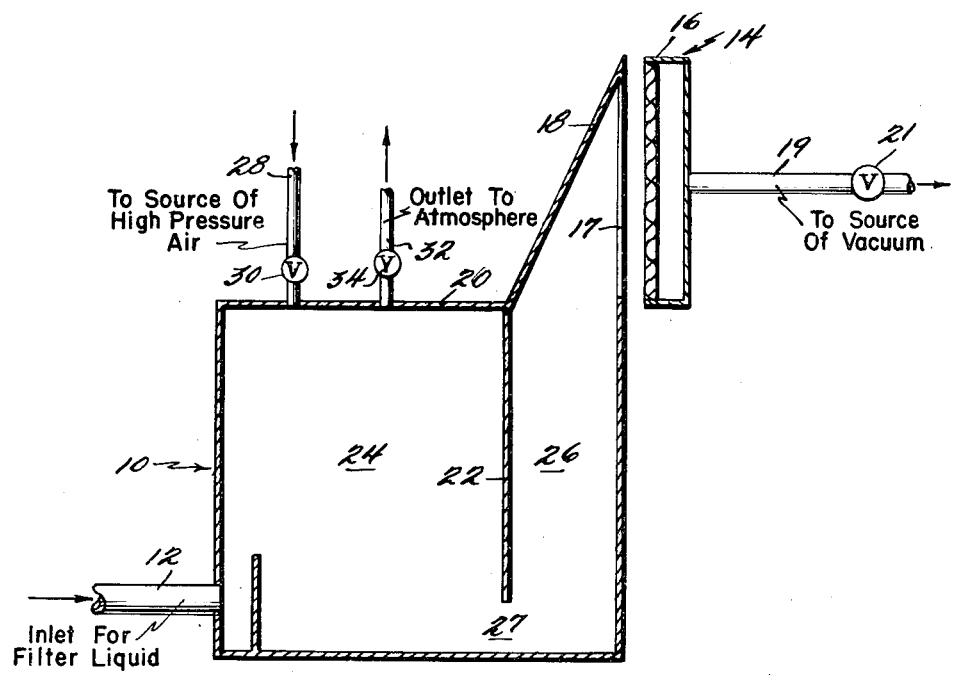
INVENTORS
THOMAS D. BAXTER
ALEXANDER A. MCINTYRE
BY Church & Church
ATTORNEYS United States Patent Office 2,771,194
Patented Nov. 20, 1956

2,771,194
METHOD OF FILTERING

Thomas D. Baxter, East Petersburg, and Alexander A. McIntyre, Lancaster, Pa., assignors, by direct and mesne assignments, to Baxter Filtration Corporation, Lancaster, Pa., a corporation of Pennsylvania Application September 14, 1953, Serial No. 379,784

5 Claims. (Cl. 210—150)

This invention relates to filtering and more particularly to a method of pressure filtering.

In the field of filtration, including many industrial processes, and also in sanitation work, there is a need for a rapid and efficient method of separating suspended particles of solid matter from a liquid carrier or of removing controlled quantities of liquid from a mixture of solids and liquid. For example, in the ceramic industry, there is a need for a method of quickly and efficiently removing controlled quantities of liquid from the clay mixture. Filtering of soap from water in commercial laundries has not heretofore been satisfactorily accomplished in a practical manner. Also, the discharge of waste by industrial establishments into rivers and streams is being increasingly subjected to governmental control, with the result that there is a great need on the part of many of these establishments for a method of quickly and efficiently filtering out solid suspended matter from a liquid carrier before neutralizing and discharging the liquid carrier into a river or stream.

Many of the present filtering methods utilize a stationary filter cloth or screen and force the liquid which is being filtered through the filter cloth under the influence of pressure and/or vacuum until a predetermined quantity of liquid, such as a volume filling a given filter tank, has passed through the filter cloth. In filtering methods of this type, the filtering effect of a given filter cloth rapidly diminishes as the time interval from the beginning of the filtration period increases, so that a high rate of filtration at the beginning of the filtration period rapidly diminishes as solids accumulate on the filter cloth. It can be appreciated that it is highly inefficient to continue filtration after the face of the filter cloth has reached a predetermined degree of saturation, since the time required to filter a given unit volume of liquid is much higher after saturation of the filter screen has occurred than before such saturation.

Another troublesome aspect of filtering methods and apparatus presently in use is that relating to the removal of the filter cake of solid material which accumulates on the intake face of the filter screen of cloth. Removal of the filter cake has been particularly difficult in pressure filtering systems in which the filter cake often tends to become compressed and hardened and blinds the pores of the filter so that considerable time and effort are required to clean the filter between operations. In many filtering methods presently in use, an entire batch of liquid to be filtered, such as the entire contents of a filter tank, for example, is passed through the filter cloth, after which the cloth is cleaned in readiness for another filtering operation. When this procedure is followed three factors may contribute to the compacting and hardening of the filter cake on the filter cloth, as follows:

(1) If the filter cloth becomes saturated with deposited matter before the tank has been emptied, the rate of flow through the filter cloth may decrease to such an extent as to permit the filter cake to begin to harden.

(2) The liquid level may drop below certain portions of the filter cloth before the complete batch of liquid has been filtered, permitting accumulated solids on the portion of the filter above the liquid level to harden.

(3) After all of the liquid has passed through the filter colth, the filter cake on the entire face of the cloth may be subjected to air pressure which causes compacting and hardening of the filter cake.

The continued application of pressure to a filter through which liquid is no longer passing may also result in a collapse of the crystal structure of solids which are intentionally left on the filter screen from one filtering operation to another. Thus, for example, where a filter aid, such as diatomaceous earth, for example, is applied as a precoat to a filter cloth or screen, the precoat material may be left on the filter cloth for a plurality of successive filtering operations, with only a thin outer layer of the precoat being removed after each filtering operation. Application of above-atmospheric pressure to the precoat layer after the discontinuance of liquid flow through the filter may result in a collapse of the crystal structure of the precoat material, thereby adversely affecting the filtering ability of the precoat material on subsequent filtering operations.

In certain types of filtering operations, where the filter cake is the desired end product of the filtering operation, it is necessary to control the moisture content of the filter cake to a predetermined value. In using filtering methods in accordance with the prior art, it is frequently difficult to control moisture content of the filter cake.

Accordingly, it is an object of this invention to provide a rapid and efficient method of filtering suspended particles from a liquid carrier.

It is a further object of this invention to provide a method of filtering in which a substantially uniform rate of filtration is maintained.

A still further object of this invention is to provide an improved method of removing controlled quantities of liquid from a mixture of solids, such as a clay mixture, for example.

Another object of this invention is to avoid compacting and hardening of solids on the filter screen or cloth to thereby facilitate removal of the filter cake from the filter cloth.

Still another object of the invention is to avoid the compressing of solids into the filter cloth to thereby avoid blinding of the cloth of the compressed solids.

Still another object of this invention is to avoid the application of pressure to a filter in such manner as to collapse the crystals of solids, such as precoat or filter aid materials, which may remain on the filter cloth for subsequent filtering operations, thereby maintaining the filtering ability of such solids.

In accordance with this invention, liquid being filtered is forced through a filter cloth or screen under pressure, and the pressure is relieved while liquid is still passing through the filter cloth and before the filter cloth has become saturated with solids. The filter cloth is preferably located at a level above the normal unpressurized liquid level, the pressure raising the liquid to the level of the filter where it is substantially equally distributed over all portions of the filter face. When the pressure is relieved, the liquid on the intake side of the filter cloth drops away by gravity from the filter while the accumulated solids on the cloth are still wet. By removing the pressure while liquid is still passing through the filter, the filter cake does not become hardened and compacted due to continued application of pressure without a corresponding flow of liquid through the filter. The removal of pressure while liquid is still flowing through the filter prevents the compressing of solids into the filter cloth, or collapsing of the crystal structure of the solids on the filter cloth. The filter cake which is deposited on the filter cloth may then be easily removed. Prior to removal of the filter cake from the cloth, the cake may be dried to a predetermined moisture content, if required, by the application of a pressure differential, such as a vacuum, to opposite sides of the filter cloth to remove a controlled quantity of moisture from the filter cake.

The filter cloth or screen is cleaned after each filtering operation by the removal of the deposited filter cake. In case a precoat layer of a filter aid such as diatomaceous earth is used, the precoat material may be allowed to remain on the filter cloth for more than one filtering operation.

In substance, this invention provides a filtering method in accordance with which the filtering occurs in a succession of short cycles, each cycle including the steps of (1) forcing of the liquid through the filter under pressure; (2) relieving the pressure while liquid is still passing through the filter to cause the liquid to fall away from the face of the filter, the pressure cut-off being timed to occur while the filter cake is still relatively thin and while the rate of filtration is still good; (3) drying the filter cake, if desired, to a predetermined moisture content by the application of vacuum after pressure cut-off; and (4) cleaning the filter cloth by removing the deposited filter cake.

The features of this invention which are believed to be novel are set forth with particularity in the appended claims. The invention itself, however, both as to its organization and use, together with further objects and advantages thereof, may best be understood by reference to the following description taken in connection with the accompanying drawing in which:

Fig. 1 is a diagrammatic representation of a filtering equipment which may be used in practicing the filtering method of this invention.

In accordance with the method of filtering of this invention, a quantity of liquid or mixture of solids and liquids to be filtered is admitted into a closed tank 10 through an inlet 12 at the lower portion of the tank. The tank is provided with a vertical extension 18 which rises above the flat top portion 20 of the tank. A filter head generally indicated at 14 provided with a porous filter member, such as filter cloth 16, is positioned on a level above the top of the tank 10 and in communication with an opening 17 in vertical extension 18. The filter head 14 is connected to a suitable source of vacuum through a conduit 19 under control of a valve means 21. In order to permit cleaning of the filter cloth 16, the filter head 14 is movable out of engagement with opening 17. Suitable power and control means may be provided to move filter head 14 if desired.

The tank is provided with a vertical baffle member 22 which extends downwardly from the underneath surface of flat top portion 20 to closely adjacent the bottom of the tank. Baffle 22 divides the tank into compartments 24 and 26 on opposite sides of the baffle. Compartment 26 extends upwardly into the vertical tank extension 18 and communicates with the filter head 14 through opening 17. Compartments 24 and 26 communicate with each other beneath baffle 22 through a passage indicated at 27. A source of high pressure air is connected to the upper portion of compartment 24 through a conduit 28 under the control of a valve means 30. Compartment 24 also communicates with the atmosphere through a conduit 32 under the control of a valve means 34.

To commence a filtering operation, the tank 10 is filled to a predetermined desired level through conduit 12 with the liquid to be filtered, the liquid standing at the same height in both compartments 24 and 26. The movable filter head 14 is moved into sealed engagement with the opening 17 at the upper end of compartment 26. The filter head is connected to a source of vacuum through valve 21 and conduit 28 and valve 30 are opened to admit high pressure air above the liquid in compartment 24, valve 34 to the atmosphere being closed at this time. The high pressure air forces the liquid in compartment 24 downwardly and raises the level of the liquid in compartment 26 above the liquid level in compartment 24, the liquid rising in a column into the portion of compartment 26 located in vertical extension 18 and being forced through the filter cloth 16. Suspended particles of solid matter in the liquid being filtered are deposited on the intake surface of filter cloth 16 which is disposed toward the interior of compartment 26. The filtered liquid, free of the suspended particles, passes through the filter cloth 16 outwardly from the filter head 14 through duct or conduit 19 to a suitable discharge point. The liquid being filtered passes through the filter cloth 16 principally due to the high air pressure applied through conduit 28 which forces the liquid up to the level of the filter and through the filter. The vacuum is applied through conduit 19 principally as a means of removing liquid from the discharge side of the filter to a suitable discharge point. The secondary purpose of the vacuum applied through line 19 is to dry the solids deposited on the filter cloth if so desired, this secondary purpose being achieved after pressure is removed.

In order that filtering will occur only while the filter cloth 16 is operating in its most efficient operating range and with good filtration rates, pressure is removed from compartment 24 at a predetermined time which depends upon the characteristics of the liquid being filtered and also upon the characteristics of the filter cloth or screen being used. The optimum pressure cut-off time for a given material being filtered through a given filter cloth or screen can be determined empirically by experimentation. Pressure is removed from compartment 24 by closing valve 30 in the high pressure inlet line 28 and by opening valve 34 in outlet 32 to the atmosphere. Vacuum through conduit 19 is cut back or off during the pressure release portion of the cycle to facilitate the falling away of excess liquid from the intake side of the filter cloth.

In any event, pressure is always removed while there is still a supply of liquid available in tank 24 and liquid is still passing through the filter cloth, so that the filter cake will not be subjected to pressure when liquid is not flowing through the cloth. Even if the filter cloth has not become saturated and is still filtering at a good rate within its efficient range of operation, pressure is removed from the liquid if the liquid supply is becoming depleted, in order to avoid any possibility of air pressure being applied to the filter without a corresponding flow of liquid through the filter.

Upon withdrawal of the pressure from compartment 24, the column of liquid in compartment 26 drops to the same level as that in compartment 24, the liquid in chamber 26 dropping away from the face of filter screen or cloth 16. The filter head 14, with the filter cloth 16, is then moved out of engagement with the opening 17 of compartment 26 and the filter cloth 16 is suitably cleaned by scraping or by any other suitable method of cleaning, or a new and clean filter cloth is substituted in place of the filter cloth which has just been used.

Since pressure cut-off occurs while liquid is still flowing through the filter, the solid particles which have accumulated on the filter cloth are in a moist condition which facilitates their removal by a cleaning or scraping operation. Furthermore, removal of pressure while liquid is still flowing through the filter prevents compacting of solids on the filter cloth. This is in contrast to the compacted condition of filtered particles often found in filtering systems in which filtering is continued until a given quantity of liquid has passed through the filter and air pressure is applied even after all liquid has passed through the filter to thereby compress and harden the solids on the filter cloth.

After pressure cut-off, and before the filter cake is removed from the filter cloth, the filter cake may be dried to a predetermined moisture content, if desired, by the application of vacuum through conduit 19. In certain filtering operations, where vacuum alone is insufficient to dry the filter cake, and where pressure will not adversely affect the filter cake or the filter media, air pressure may be applied for purposes of drying on opposite sides of the baffle 22 after removal of the pressure that deposited the cake on the filter cloth. Since the air pressure is applied above the surface of the liquid on both sides of the baffle, the liquid level will be the same on both sides of baffle 22. Drying by use of air pressure as just described might be employed in the tile industry, for example.

The application of a pressure differential, such as a vacuum or even, in certain cases, direct air pressure, to the filter for purposes of drying is not inconsistent with the teaching that pressure used for forcing the filter liquid through the filter cloth should only be applied while liquid is passing through the filter. The pressure differential used for drying normally differs greatly in magnitude from that used for forcing liquid through the filter and is of such value as not to cause any undesirable compacting effect on the filter cake.

The drying of the filter cake has been described in terms of a pressure differential such as a vacuum, applied to the opposite surfaces of the filter cake. However, it will be understood that the actual drying is accomplished by a flow of gas, such as air, through the filter cake, the gas flow being produced by the pressure differential.

The opening and closing of valves 30 and 34, and also the axial movement of filter head 14 into and out of seated engagement with opening 17 may be controlled by a suitable timing device. In such case the timing device is adjusted to close valve 30 and open valve 34 and to move filter head 14 out of engagement with tank 10 at the predetermined optimum time which must satisfy both of the aforementioned conditions; namely, (1) pressure must be cut off while liquid is still flowing through the filter and while the filter cake is still wet; and (2) pressure must be cut off before a predetermined undesirable degree of saturation of the filter has occurred.

In filtering a given batch of liquid, the filtering cycle hereinbefore described may be repeated a number of times, each cycle being of relatively short duration and permitting the depositing of only a relatively thin filter cake as compared to the thickness of filter cakes normally obtained in filtering operations in accordance with the prior art.

It can be seen from the foregoing that this invention provides an improved methohd of filtering which is much more efficient than presently known methods and which permits the filtration of much larger quantities of suspension-bearing liquids in a given time than presently known methods. The method of this invention is applicable to any filtering operation in which it is desired to remove suspended particles from a liquid carrier or to remove liquid from a mixture of solids. The solid particles to be removed from the liquid may be waste products, as in the filtration of industrial waste before discharging the carrier liquid into a river or stream, or the filtration may be in connection with an industrial process, such as the removal of liquid from a clay mixture, a necessary process step in the ceramic industry. The method in accordance with this invention permits accurate control of the moisture content of the filter cake where such control is required.

While there has been shown and described a particular embodiment of the invention, it will be obvious to those skilled in the art that various changes and modifications can be made therein without departing from the invention and, therefore, it is aimed in the appended claims to cover all such changes and modifications as fall within the true spirit and scope of the invention.

We claim as our invention:

1. The method of filtering which comprises the steps of applying a pressure differential to opposite sides of a filter medium to cause a liquid containing suspended solids to flow through the filter medium, while the liquid is still flowing equalizing the pressure on opposite sides of the filter medium to discontinue the flow of liquid therethrough, and then separating the liquid and the filter medium.

2. The method of filtering which comprises the steps of elevating a liquid containing suspended solids from a supply to a filter medium, applying a pressure differential to opposite sides of the filter medium to cause the liquid to flow through the medium, and while the liquid is still flowing through the medium equalizing the pressure on opposite sides of the medium to discontinue the flow of liquid therethrough and permit the liquid to fall away from the medium.

3. The method of filtering defined in claim 1 wherein the steps of the filtering cycle are repeated and each cycle is of relatively short duration permitting the deposit of a relatively thin layer of solids on the filter medium.

4. The method of filtering a liquid containing suspended solids which comprises the steps of forcing the liquid under pressure through a filter medium, and relieving the pressure while the liquid is still flowing through the medium to discontinue the flow and permit the liquid to fall away from the medium.

5. The method of filtering as defined in claim 4 wherein the steps of the filtering cycle are repeated and each cycle is of short duration permitting the deposit of a relatively thin layer of solids on the filter medium.

References Cited in the file of this patent

UNITED STATES PATENTS

| | | |
|---|---|---|
| 430,120 | Fischer et al. | July 17, 1890 |
| 826,390 | Van Law | July 17, 1906 |
| 839,772 | Krause | Dec. 25, 1906 |
| 1,271,925 | Moore | July 9, 1918 |
| 1,282,280 | Peck | Oct. 22, 1918 |
| 1,987,142 | Clements | Jan. 8, 1935 |
| 2,401,039 | Bauer | May 28, 1946 |
| 2,564,174 | Roman | Aug. 14, 1951 |

FOREIGN PATENTS

| | | |
|---|---|---|
| 680,391 | Great Britain | Oct. 1, 1952 |